(12) United States Patent
Pezeshki et al.

(10) Patent No.: US 6,760,499 B2
(45) Date of Patent: Jul. 6, 2004

(54) BIREFRINGENCE COMPENSATED INTEGRATED OPTICAL SWITCHING OR MODULATION DEVICE

(75) Inventors: Bardia Pezeshki, Fremont, CA (US); Mark Missey, San Jose, CA (US); Anca L. Sala, Columbus, OH (US); Craig D. Liddle, Columbus, OH (US); Barthelemy Fondeur, Columbus, OH (US)

(73) Assignee: JDS Uniphase Corporation, San Jose, CA (US)

(*) Notice: Subject to any disclaimer, the term of this patent is extended or adjusted under 35 U.S.C. 154(b) by 143 days.

(21) Appl. No.: 10/190,930

(22) Filed: Jul. 8, 2002

(65) Prior Publication Data

US 2003/0026518 A1 Feb. 6, 2003

Related U.S. Application Data (60) Provisional application No. 60/308,559, filed on Jul. 31, 2001.

(51) Int. Cl.$^7$ .............................. G02B 6/12; G02F 1/295
(52) U.S. Cl. ........................... 385/14; 385/4; 385/8; 385/9; 385/40
(58) Field of Search .................. 385/1–4, 8–9, 385/14, 24, 40

(56) References Cited

U.S. PATENT DOCUMENTS

| | | | |
|---|---|---|---|
| 5,502,781 A | 3/1996 | Li et al. ......................... 385/4 |
| 2002/0076149 A1 * | 6/2002 | Deacon ......................... 385/27 |
| 2002/0159702 A1 * | 10/2002 | Liu et al. ....................... 385/40 |
| 2003/0039447 A1 * | 2/2003 | Clapp ............................ 385/40 |
| 2003/0048975 A1 * | 3/2003 | Lackritz et al. ............... 385/14 |

FOREIGN PATENT DOCUMENTS

WO    WO 00/52518    9/2000    ............. G02F/1/01

* cited by examiner

Primary Examiner—Hemang Sanghavi
(74) Attorney, Agent, or Firm—Allen, Dyer, Doppelt Milbrath & Gilchrist, P.A.

(57) ABSTRACT

A planar waveguide Mach-Zehnder interferometer (MZ) has improved performance as a variable optical attenuator as well as a thermo-optic switch (TOS) with reduced polarization dependent loss (PDL) in high attenuation states. The PDL was reduced by correcting for the increased birefringence that occurs on heating one waveguide arm by making the two waveguides inherently asymmetric, such that when one of the waveguides is heated, the differential birefringence of the two arms becomes zero. This asymmetry can be realized simply by changing the width of one of the waveguides. The modified device allows for very small PDL in the high attenuation state of a VOA and for theoretically perfect contrast in a TOS in the off state, with only a small penalty in PDL of the on state.

24 Claims, 4 Drawing Sheets

BIREFRINGENCE COMPENSATED INTEGRATED OPTICAL SWITCHING OR MODULATION DEVICE

CROSS REFERENCE TO RELATED APPLICATION

The present application claims priority to provisional application having Ser. No. 60/308,559, entitled "Birefringence compensation in waveguide thermo-optic switches" filed on Jul. 31, 2001, which is incorporated herein by reference.

BACKGROUND OF INVENTION

The present invention relates to an integrated planar waveguide optical device suitable for switching optical signals between three or more ports and/or modulation of the optical intensity, and more particularly, to an integrated optical Mach-Zehnder interferometer device having low polarization dependent loss at a high level of attenuation or signal isolation.

Integrated optical switching or modulation devices are based on the conventional Mach-Zehnder (M-Z) interferometer geometry and comprise two or more channel waveguides formed on a planar substrate. The two channel waveguides are usually parallel to each other and separated at the terminal ends, which form the input and output ports of the device. The waveguides come in sufficiently close proximity to each other in two discrete regions permitting exchange of light by optical coupling. These regions, referred to as optical couplers, generally divide the incident light beam arriving from an input port of one waveguide equally between both waveguides. Thus, light entering one waveguide is split in the first coupling region, or input coupler, so that it propagates with equal intensity in both waveguides until it reaches the second, or output, coupler. Accordingly, the portion of the channel waveguides located between the input and output couplers are referred to as the waveguide arms. If the optical path length of both arms is the same in the normal, that is un-activated state of the device, the two beams recombine in phase and are transmitted without modulation of intensity to a common output port, the incident optical signal crossing from the first channel waveguide input port to the output port of the second channel waveguide.

If the optical path length of the two arms is different by a half wavelength, which is out of phase, the two beams recombine without modulation of intensity at the output port associated with the same waveguide input port.

Thus switching of signals between output ports is achieved by the selective modification of the optical path lengths of waveguide arms by a half wavelength. Selective control of the optical path length differences of less than half a wavelength split the incident beam energy between the output ports, permitting the device to be used as a variable optical attenuator as well as an optical switch.

As the optical path length of the waveguide arms is a function of the local refractive index in the waveguide media, modulation of the refractive index of either of the waveguides changes the optical path length to cause either partial or total destructive interference of the co-propagating optical signals, which permits the selected attenuation of the output signal, or switching of the signal to the output port of the first waveguide.

Refractive index modulation in one or more arms of the M-Z optical waveguide device may be accomplished by exploiting the electric or magnetic field responsive optical properties of particular waveguide materials, or by utilizing the thermo-optical properties or stress-optical properties of a wide range of materials. An actuator is connected to a control circuit such that the selective application of an electromagnetic field or bias to an actuator associated with one or more arms of the device induces a strain, temperature change or otherwise modifies the refractive index of the selected arm, or arms, to induce the desired phase difference. For example, U.S. Pat. No. 5,502,781, which is incorporated herein by reference, discloses integrated optical devices which utilize either a magnetostrictively, electrostrictively or photostrictively induced stress to alter the optical properties in one or more waveguide segments of the device. Latchable integrated optical devices are achieved by utilizing a controlled induced stress to "tune" one or more waveguides to a desired refractive index or birefringence, which will be retained after the field is removed.

Thin film heaters are a preferred actuator for exploiting the thermo-optical properties of the waveguide materials, being generally compatible with other thin film processes and materials used to fabricate the waveguide and/or substrate.

However, it has been found that thin film heaters and other actuators limit device performance via second order effects. Channel waveguides are generally fabricated from materials that are homogenous and optically isotropic in the bulk state, having a single refractive index. Device fabrication methods and actuator designs may induce optical anisotropy in the channel waveguide such that the refractive index will vary depending on the polarization state of the incident light propagating in the waveguide. The difference in refractive index of a material is referred to as birefringence. The propagation characteristic of unpolarized light in a birefringent media is readily evaluated by decomposition into vectors of orthogonal polarization states, TM and TE. This difference in birefringence between the two arms of the M-Z interferometer results in a polarization dependent loss in the optical signal.

Prior art integrated planar waveguide M-Z devices, such as disclosed in WO 00/52518, which is incorporated herein by reference, suggest that the actuation mechanism should be designed so as to avoid introducing birefringence in the plane orthogonal to the direction of signal propagation in either of the waveguide arm segment. More specifically, this application discloses a method of placing piezoelectric ribs actuators on selected region of a Mach-Zehnder optical device to minimize differential strain perpendicular to the waveguide channel.

Accordingly, it is an object of the present invention to provide an integrated optical Mach-Zehnder interferometer device having a low polarization dependent loss at high levels of signal attenuation or isolation.

It is a further object of the invention to provide a simple means for decreasing the polarization dependent loss that avoids the addition of compensating components or additional process steps in fabricating the integrated optical Mach-Zehnder interferometer device.

SUMMARY OF INVENTION

An integrated optical Mach-Zehnder interferometer device comprises a first and second channel waveguide formed in or on a substrate which are connected at their terminal ends to plurality of input and output ports through an input coupler and an output coupler.

In the case of thermal optical switches or variable attenuators where the selective adjustment of refractive index of the waveguide channel material occurs by selective temperature change of one of the channel waveguides, the polarization dependent loss (PDL) may be significant depending on the thermal properties of the substrate and the temperature change required to sufficiently modulate the refractive index of the optical media forming the channel waveguide. Moreover, it has been found that polarization dependent loss may increase dramatically as the incident optical signal is attenuated or switched, as even a linearly proportional increase in birefringence with refractive index of the channel waveguide material results in a non-linear increase in PDL.

In one aspect of the invention the aforementioned limitation is overcome by utilizing a first or second channel waveguides having an initial birefringence Δ, to compensate for an increased birefringence on actuation of the switch or modulation device. The first and second channel waveguides are preferably of unequal physical path length such that the optical path length is substantially equal when the device is not energized. The change in birefringence induced by heating the first or second channel waveguide is of equal magnitude to the initial birefringence in the first or second channel waveguide.

DETAILED DESCRIPTION

Figure 1:
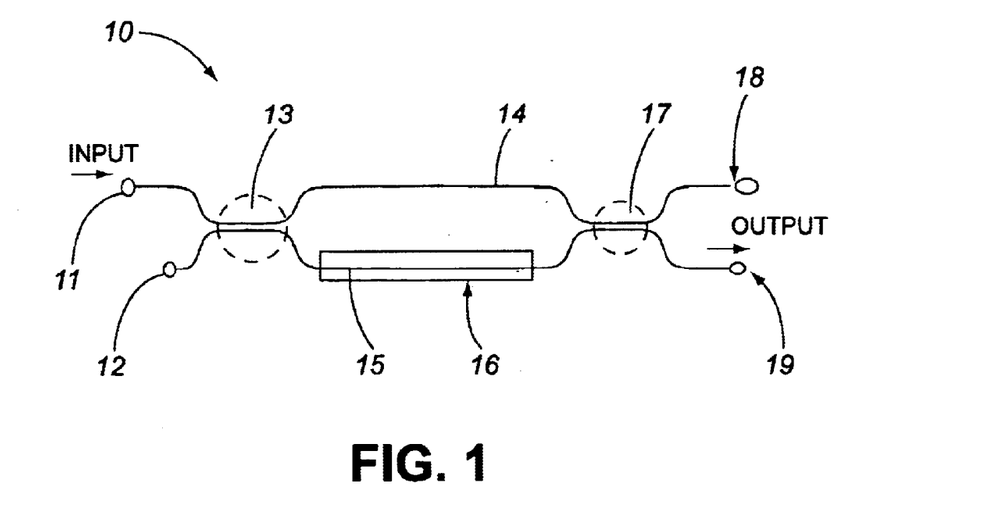
FIG. 1 is a schematic of an integrated optical M-Z device capable of providing optical attenuation or switching functionality.

An integrated optical Mach-Zehnder interferometer device 10 useful as a switch or variable attenuator is shown in FIG. 1 below. A light beam carrying one or more optical signal channels enters the device via input port 11, which transmits the light beam via an input branch segment 14a of a channel waveguide 14 formed on the substrate (not shown) to a 3 dB coupler 13. Input port 12 is optionally available so that the device can be function as a 2×2 switch. The 3 dB coupler equally splits the power between the arm segments 14b and 15b of channel waveguides 14 and 15 respectively. At least one of the arm segments 14b or 15b of channel waveguides 14 and 15 has associated with it an actuator for modifying the refractive index of at least one of arms 14 or 15. In a preferred embodiment the actuator is a heater 16 that is in selective thermal contact to a least one arm segment. The heater 16 is typically fabricated above the waveguide cladding, so as to selectively increase the refractive index of the corresponding waveguide arm on activation. The light in the two arms recombines in a second 3 dB coupler 17, for selective transmission via output arms segment 14c or 15c to one of output ports 18 or 19. Generally, the arm segments 14b and 15b are the same length, such that in the un-activated state, the two beams recombine in phase and substantially all of the power in the incoming light beam exits through output port 19 on the opposite side of the device, in a so called cross configuration. When heat is applied to one of the arms, the refractive index of the light is changed making the two beams out of phase. Depending on the amount of electrical power applied, the interference of the beams can be made partially or totally destructive producing the desired amount of attenuation at the output. When the destructive interference is partial the device functions as a variable optical attenuator (VOA).

One of the problems with such a device is that operation of the actuator induces a differential birefringence between the arms of the Mach-Zehnder interferometer. For example, in the case of a thin film heater (used to form a thermo-optical switch (TOS) or a variable optical attenuator) a first contribution to the total birefringence may arise just by depositing a metallic layer that acts as a resistive heater element onto one of the waveguides arms. It appears that the process of deposition causes birefringence by inducing a non-uniform stress in the underlying channel waveguide materials, the stress varying within the plane orthogonal to the beam propagation direction. The value of this birefringence Δ1 appears to be constant, not varying with the current passed through the heater. Having thin film heaters on both waveguide arm segments arms can compensate for this constant birefringence, as only one thin film heater is energized during device actuation. However, the second contribution to this birefringence, Δ2, is more problematic as it is not constant, in that it occurs on activating the heater as the waveguide birefringence increases as the applied current is increased.

Not wishing to be bound by theory, in the case of device actuation by a heater the observed birefringence appears most likely due to asymmetric stress at the level of the waveguide core. While the effect of a constant change in birefringence is a shift between the transmission curves of the TE and TM polarization states, constant for any electrical power applied to the heater, a variable birefringence causes a variable distortion of transmission curves as a function of temperature between the two polarization states.

Figure 2:
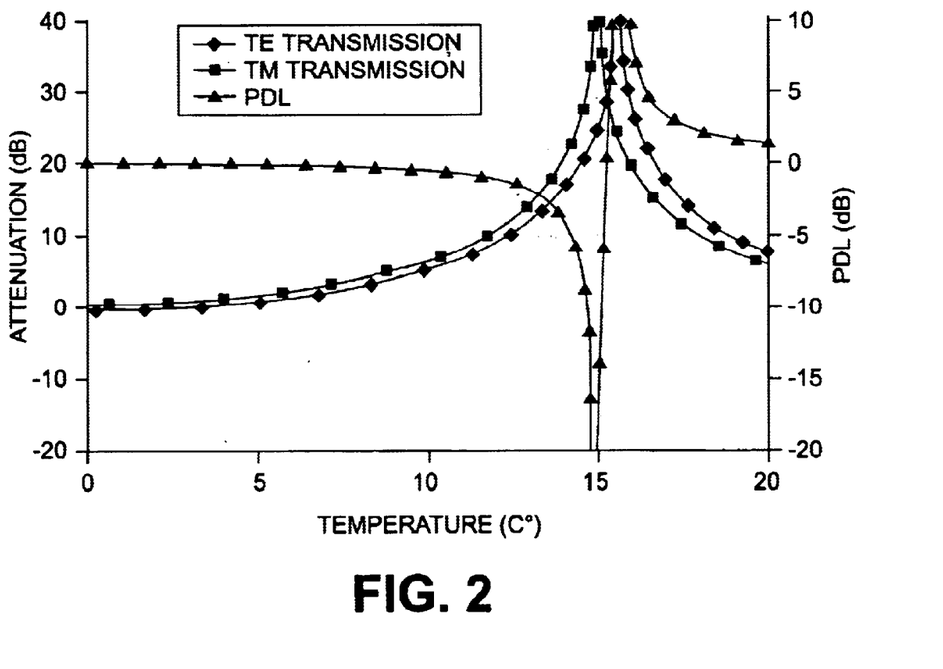
FIG. 2 illustrates the simulated attenuation of TE, TM polarizations and PDL of VOA output as a function of temperature of the heated arm.

This effect is best understood with the results of a mathematical simulation shown in FIG. 2, wherein the transmission (as attenuation in dB on the left abscissa) of the TE and TM polarization states was calculated assuming a linear increase in birefringence with temperature for an integrated optical attenuator configured according to FIG. 1. The variation of transmission for the TE and TM polarization states permits the calculation of the polarization dependent loss (PDL) as a function of either temperature or average signal attenuation. If only variable birefringence is assumed, the device will have no PDL in its minimum attenuation state, or un-activated state. The increasing split or separation of the attenuation curves of the TE and TM polarization states leads to a calculated PDL (right abscissa) that increases in a non-linear manner with temperature such that high average attenuation cannot be achieved without a great increase in PDL.

The simulations predicted trade off between high attenuation and PDL has been experimentally observed. The PDL of a typical device increases rapidly in the useful range of attenuation values of a VOA, typically 10 dB and higher. The complete switching performance is also compromised by the variable birefringence. If light with both polarizations is used, the maximum contrast that can be obtained with such a switch is about 20 dB. In the case of silica waveguide deposited on a silicon substrate this maximum contrast is reached at about a 16 degrees temperature difference between the arms.

When the TOS device is used as an attenuator the limitations in performance imposed by the variable birefringence of the heated arm is partially resolved by an alternative configuration wherein the output of the device is taken from the opposite output port, rather than from the port that transmits the optical signal in the un-actuated state. That is in the case of the device shown in FIG. 1 output port 18 is used rather than output port 19. In this configuration the device has very low birefringence, and consequently low PDL, in the high attenuation state, which occurs at zero temperature difference. The minimum attenuation state occurs when the heater is on. In this case there will be a slight PDL penalty in the minimum attenuation state. The disadvantage is that the device is now normally off, and requires power to turn on. When the device is used to equalize or flatten the wavelength variable gain characteristics of a typical optical amplifier, the device is primarily transmissive, requiring a large steady state power. Further, this alternative configuration does not correct for a constant difference in birefringence between the arms, such as that induced by process variations or by depositing the heater onto the arm.

Accordingly, a preferred embodiment of the invention would provide the desired normally on characteristic but without the PDL caused by the thermally induced birefringence. In one aspect of the invention this result is achieved by inducing a slight birefringence in one of the arms. This embodiment can completely eliminate the PDL caused by the constant birefringence, as well as substantially improve device performance where the variable birefringence is predominant at high attenuation levels. Ideally the variable birefringence will be compensated completely such that the TE and TM polarization states are either in phase in both arm segments or out of phase, when the heater is energized to the high attenuation state.

A simple method of modifying the birefringence of one or more of the channel waveguide arms of the inventive device is to change the aspect ratio of the waveguide cross-section, as this can be easily implemented at the design stage using existing fabrication technology with known tolerances.

In order to compensate for the variable heating induced birefringence by waveguide geometry, the sign of the variable birefringence must be known. Consistent with experimental data and also stress models, applying heat to silica waveguides on silicon substrate induces negative birefringence, making the TM index higher than the TE one, as more stress is applied to the waveguide core in the direction parallel to the substrate than in the direction perpendicular to it. This birefringence can be compensated by geometry in two ways: by reducing the width of the heated arm or by increasing the width of the non-heated arm. In the more preferred embodiment the width of the non-heated arm is increased such that the variable and compensating birefringence effects are separated to prevent any coupling interaction that might compromise the predicted device performance.

Figure 3:
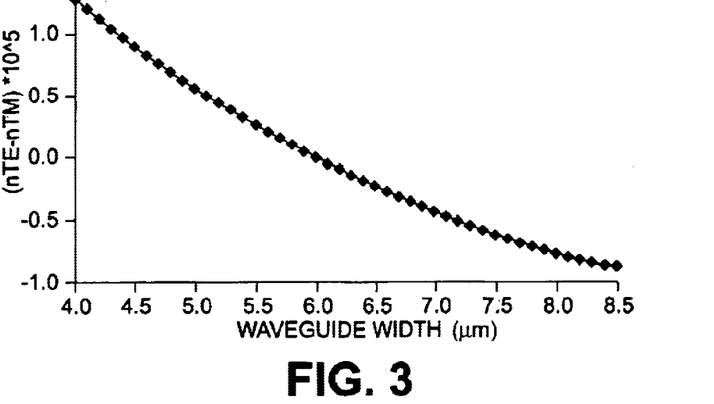
FIG. 3 illustrates a method of varying the waveguide birefringence by changing the waveguide channel aspect ratio, wherein $\Delta = n_{TE} - n_{TM}$ and is plotted as a function of waveguide width.

Simply changing the waveguide width can produce the desired level of compensating birefringence. FIG. 3 shows the calculated birefringence, the difference between TE and TM effective indices, of a doped silica glass waveguide on a silicon substrate as a function of waveguide width (n-core= 1.4552, n-cladding=1.4452, waveguide height=6 microns). When the width is greater than the channel height, 6 microns, the TM effective index is greater than the TE effective index, whereas narrowing the channel width has the opposite effect.

The inventive modification is applicable to a range of thermo-active switches and attenuators, for example where the channel waveguide is fabricated from silica on a silicon substrate, or when the channel waveguides are composed of organic materials, such as disclosed in U.S. Pat. Nos. 6,084,050; 6,122,416 and EP 1 018 665 A1, which are incorporated herein by reference.

Alternative methods of providing the compensating birefringence in one arm is to vary the composition of the arms such that heating both arms produces the required birefringence difference. The desired composition of waveguides arm segment might be achieved by selective doping in the case of glass waveguides, changing the chemical composition using a different deposition step for each waveguide arm, such as different polymers for organic waveguides, such as disclosed in U.S. Pat. No. 6,122,416.

Additionally the composition may be selected for optical properties that may be magnetostrictively, electrostrictively or photostrictively modified, by providing the appropriate actuator, such that the birefringence can be modulated or tuned without a substantial increase in the effective refractive index. One or more of the waveguide channel may be fabricated in a birefringent crystalline medium, such as lithium niobate wherein the optical path difference is shifted by an electro-optic effect, such as disclosed in U.S. Pat. No. 4,709,978, which is incorporated herein by reference.

Figure 8:
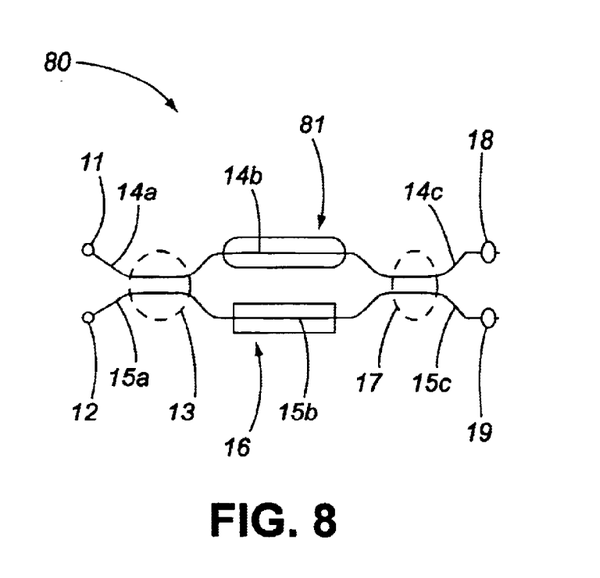
FIG. 8 is a schematic of an integrated optical M-Z device having a first actuator for refractive index modulation and a second actuator for birefringence adjustment.

Additionally, as WO 00/52518 teaches a method of placing piezoelectric ribs on selected region of a Mach-Zehnder optical device so as to avoid inducing birefringence on device activation, a piezoelectric rib may be readily deployed to provide a variable level of birefringence correction to at least one of the waveguide arms. This configuration is schematically illustrated in FIG. 8 for device 80, which is analogous to the device described in FIG. 1, in which a second actuator 81 is associated primarily with waveguide arm segment 14b and is a piezoelectric rib while a first actuator 16 is associated with waveguide arm segment 15b. Alternatively, the piezoelectric rib may be positioned to induce a birefringence in waveguide arm segment 15b that is of substantially the same magnitude but opposite sign to that induced in the waveguide arm segment 15b by operation of actuator 16.

One of ordinary skill in the art will appreciate that inorganic waveguides formed by ion implantation, UV or e-beam illumination, ion diffusion into a glass waveguides, polymer based waveguides and the like may also be used. The magnitude and sign of the birefringence change of the waveguide arms fabricated from such materials is readily characterized in a like manner.

In another preferred embodiment the compensating birefringence is achieved by decreasing the waveguide width where the heated arm is narrowed, rather than the non-heated arm. The width cannot be decreased too much, as this decreases the confinement of light in the waveguide and can result in more propagation loss.

In yet another aspect of the invention the physical path length of the waveguide arm segments is adjusted to account for the difference in average effective index of the waveguide, as in many cases the birefringence compensating waveguide arm will have a different effective index with respect to the otherwise unmodified waveguide arm segment. Absent this adjustment there will be a phase difference between the two arms even when the actuator is not operated or energized. Thus the phase difference must be either zero or integer multiple of 2□ to achieve the minimum attenuation state when the actuator or heater is not operated. Thus in a most preferred embodiment this is further compensated by increasing the length of the arm that has a lower effective index.

Alternatively, a non-zero phase difference between the two arms (when actuator is not powered or energized) can be introduced intentionally in order to reduce the amount of power that needs to be applied to switch or modulate the device. That is the phase difference need not be limited to zero or integer multiples of $\pi$ when the actuator is not operated. Preferably, heaters or other actuators are present on both arm segments for alternative operation in order to either switch optical signal between output ports, select between the minimum and maximum attenuation states, or provide a continuously variable level of attenuation.

Figure 7:
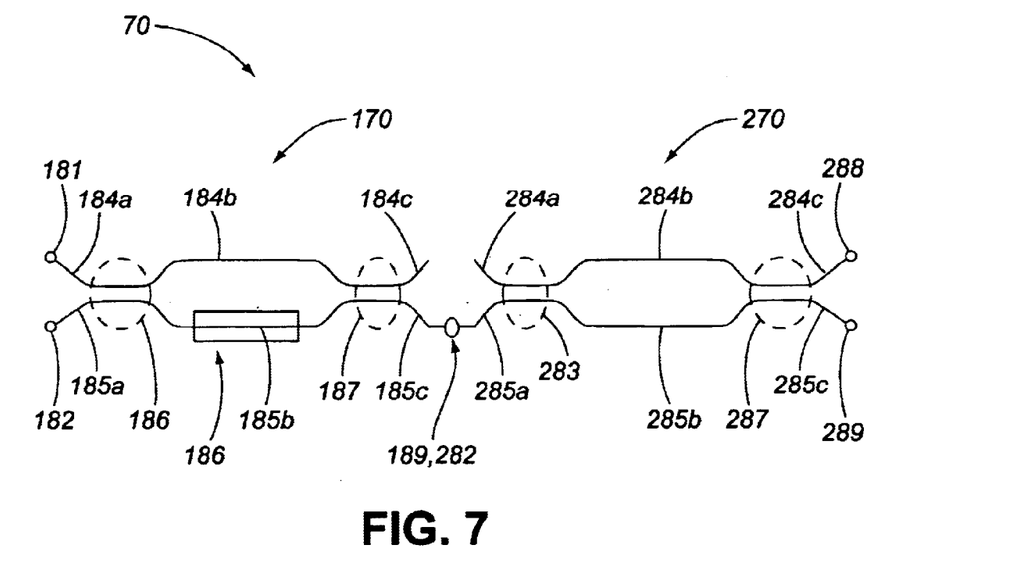
FIG. 7 is a schematic of an integrated optical device comprising a first and a second Mach-Zehnder interferometer that are cascaded or connected series.

In the case of an optical switch, such as a TOS, a high modulation ratio also requires couplers with a coupling ratio close to the desired value of 50%. To make up for process variations that result in couplers with coupling ratios different from 50% a configuration based on cascading two MZ stages can be used, such as disclosed in U.S. Pat. No. 5,247,594, which is incorporated herein by reference. As illustrated in FIG. 7, the same method can be applied in each M-Z circuit of a two-stage device for controlling the PDL.

FIG. 7 illustrates schematically the potential operating modes of an integrated optical device having a first stage 170 and the second stage 270 stage, each of which is a M-Z interferometer substantially the same as the device illustrated in FIG. 1. In the first stage 170 a light beam carrying one or more optical signal channels enters the device via input port 181(or 182), which transmits the light beam via a channel waveguide formed on a substrate (not shown) to a 3 dB coupler 183. The 3 dB coupler equally splits the power between the arm segments of two channel waveguides 184b and 185b. At least one of the arm segments of channel waveguides 184b and 185b has associated with it an actuator 186, for example a heater, to selectively increase the refractive index of the corresponding waveguide arm on activation. The second M-Z device 270 is configured on a common substrate (not shown) with first stage 170, having waveguide arm segments 284b and 285b and output ports 288 and 289. The stages are cascaded, that is connected in series, in that output port 189 of the first device 170 connects to the input port 282 of the second device 270, such that output branch 185c and input branch 285a are respectively contiguous. Accordingly, birefringence arising from actuation of arms 184 or 185 can be compensated for at least in part in at least one of arms 284 or 285. Alternatively, a second actuator (not shown) can be associated with waveguide arm segments 284 or 285 to provide a variable level of birefringence correction to at least one of waveguide arm segments 284 or 285.

The same device illustrated in FIG. 7 may be operated with a light beam carrying one or more optical signal channels entering the device via ports 288 or 289, such that the light beam propagates towards ports 181 or 182. In this embodiment of the invention the previously denominated input ports and output ports have the opposite function.

EXAMPLES

Figure 4:
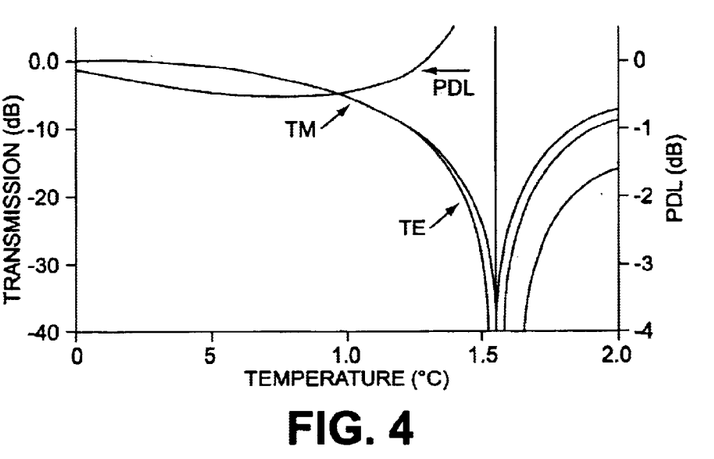
FIG. 4 illustrates the transmission of the TM and TE polarization states as a function of the temperature difference between the two waveguide arm sections and PDL as calculated in example 1.
Figure 5:
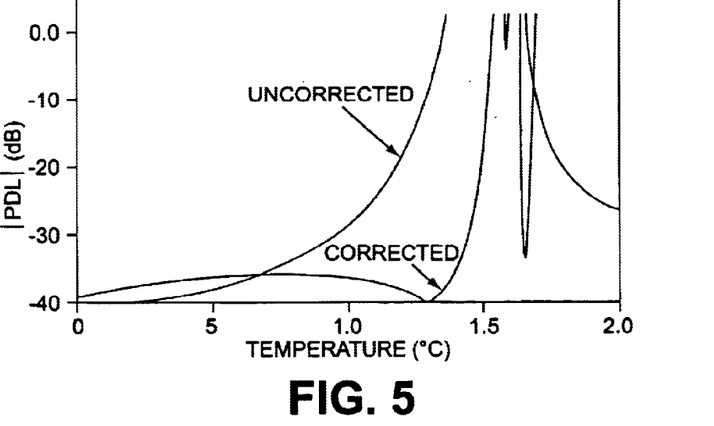
FIG. 5 compares the PDL as a function of the temperature difference between the two waveguide arm sections for an uncorrected device and the collected device of example 1.

As a first example, one could compensate the $1.7 \times 10^{-5}$ birefringence assumed in FIG. 2 by decreasing the waveguide width of the heated arm from 6 microns to 3.6 microns. This slight birefringence would again cause some PDL in the on state, but allow for very high contrast in the off state. FIG. 4 shows the calculated transmission of the two polarization states in such a compensated device. The two nulls overlap substantially, resulting in an increase in the maximum contrast ratio (for unpolarized light) from 20 dB to better than 30 dB. The PDL is less than 0.5 dB nearly everywhere, except for close to the nulls. It is important to note, as shown in FIG. 5, that even though the PDL has increased in the corrected device at zero bias, it is still lower than the uncorrected device nearly everywhere except for close to zero bias.

Figure 6:
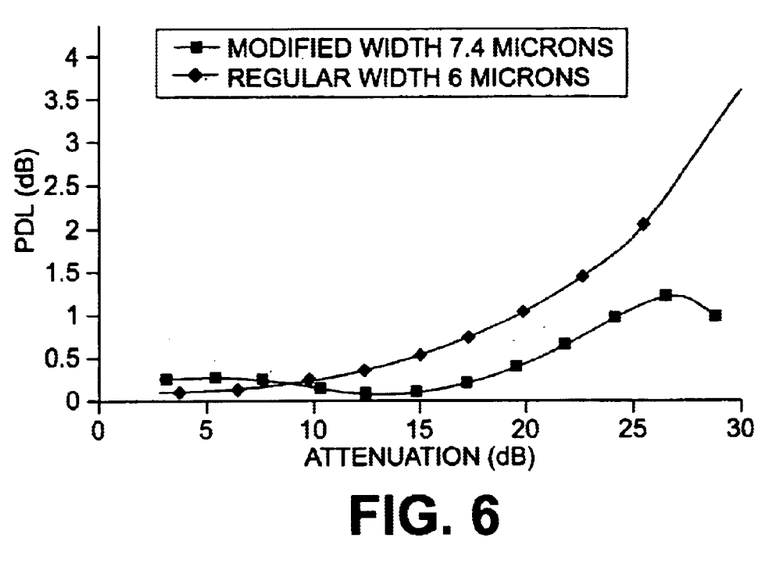
FIG. 6 illustrates the result of example 2 showing PDL as a function of the attenuation with and without modification of the width of the non-heated arm segment.

As a second example, one could compensate part of the birefringence assumed in FIG. 2 by increasing the waveguide width of the non-heated arm from 6 microns to 7.4 microns. This slight birefringence would cause some PDL in the minimum attenuation state, but allow for very low PDL in the high attenuation states, e.g. for values of attenuation up to 20 dB. FIG. 6 shows measured values of PDL vs. attenuation for a VOA device with and without the birefringence induced by changing the waveguide arm segment aspect ratio.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. An integrated optical Mach-Zehnder interferometer device comprising:

a first and second channel waveguide disposed on a substrate, each channel waveguide having;

an input branch for receiving an incident light beam arriving from an input port, an output branch for directing an incident light beam to an output port, an arm segment connecting the input branch and the output branch, an input coupler connecting the input branch of at least one channel waveguide to the arm segments of the first and the second channel waveguides, an output coupler connecting the output branch of at least one channel waveguide to the arm segments of the first and the second channel waveguides, whereby the input coupler splits the light beam between the first and second arm segments and the output coupler recombines the split light beams arriving from the first and second arm segments, at least one actuator for modulating the refractive index of at least one of the first and second channel waveguide arm segments at least one of the first and second arm segments having an initial birefringence $\Delta$ of equal magnitude to the birefringence induced in the other of the first and second arm segments by operation of the actuator.

2. An integrated optical Mach-Zehnder interferometer device according to claim 1 wherein said at least one actuator is a thin film heater that modulates the refractive index by increasing the temperature of either the first or second arm segment.

3. An integrated optical Mach-Zehnder interferometer device according to claim 1 wherein the first and second arm segments have an unequal physical path length such that the optical path length is substantially equal when the device is not actuated.

4. An integrated optical Mach-Zehnder interferometer device according to claim 3 wherein said at least one actuator is associated with the first channel waveguide and the second channel waveguide has an initial birefringence Δ.

5. An integrated optical Mach-Zehnder interferometer device according to claim 3 wherein said at least one actuator is associated with the first channel waveguide and the first channel waveguide has an initial birefringence Δ.

6. An integrated optical Mach-Zehnder interferometer device according to claim 4 wherein the initial birefringence Δ is achieved by providing a first or second channel waveguide having a channel width greater than the channel height.

7. An integrated optical Mach-Zehnder interferometer device according to claim 5 wherein either the first or second channel waveguide has a width of less than six microns and the ratio between width and height of the first or second channel waveguide is greater than 1.1:1.

8. An integrated optical Mach-Zehnder interferometer device according to claim 4 wherein the width of the first channel waveguide is less than the width of the second channel waveguide.

9. An integrated optical Mach-Zehnder interferometer device according to claim 1 wherein the first and second channel waveguides have a different width to provide an initial birefringence Δ.

10. An integrated optical Mach-Zehnder interferometer device comprising:
   a) a first and second channel waveguide disposed on a substrate, each channel waveguide having;
   an input branch for receiving an incident light beam arriving from an input port
     an output branch for directing an incident light beam to an output port,
     an arm segment connecting the input branch and the output branch,
   b) an input coupler connecting the input branch of at least one channel waveguide to the arm segments of the first and the second channel waveguides,
   c) an output coupler connecting the output branch of at least one channel waveguide to the arm segments of the first and the second channel waveguides, whereby the input coupler splits the light beam between the first and second arm segments and the output coupler recombines the split light beams arriving from the first and second arm segments,
   d) a thin film heater for modulating the temperature of either the first or second arm segment,
   e) at least one of the first and second arm segments having an initial birefringence Δ of equal magnitude to the birefringence that develops on heating the first or second arm segment,
wherein energizing the thin film heater results in an input signal attenuation of greater than 20 decibels with a polarization dependent loss of less than 1.5 decibels.

11. An integrated optical Mach-Zehnder interferometer device according to claim 10 wherein energizing the thin film heater results in an input signal attenuation of greater than 25 decibels with a polarization dependent loss of less than 1.5 decibels.

12. An integrated optical Mach-Zehnder interferometer device according to claim 10 wherein energizing the thin film heater results in an input signal attenuation of greater than 20 decibels with a polarization dependent loss of less than 1.0 decibels.

13. An integrated optical Mach-Zehnder interferometer device according to claim 10 wherein energizing the thin film heater results in an input signal attenuation of greater than 20 decibels with a polarization dependent loss of less than 0.5 decibels.

14. An integrated optical Mach-Zehnder interferometer device according to claim 10 wherein the first and second arm segments have an unequal physical path length such that the optical path length is substantially equal when the thin film heater is not energized.

15. An integrated optical Mach-Zehnder interferometer device according to claim 3 wherein the channel waveguides are formed of a glass comprising silica on a planar substrate consisting essentially of silicon.

16. An integrated optical Mach-Zehnder interferometer device according to claim 3 wherein the device is a variable optical attenuator.

17. An integrated optical Mach-Zehnder interferometer device according to claim 3 wherein the device is an optical switch.

18. A process for modulating the intensity of an optical signal propagating within an integrated optical Mach-Zehnder interferometer having at least first and second waveguide arm segments, the process comprising:
   a) providing a variable stimulus to a first actuator associated with a first waveguide arm segment to increase the effective refractive index in the first arm segment,
   b) providing a variable stimulus to a second actuator associated with a second waveguide arm segment to modulate the birefringence of the second waveguide arm segment of similar magnitude and sign to the birefringence induced in the first arm segment by the first actuator.

19. An integrated optical Mach-Zehnder interferometer device according to claim 1, the device further comprising:
   a third and fourth channel waveguide disposed on the substrate, each channel waveguide having;
   an input branch for receiving an incident light beam arriving the first or second channel waveguides;
   an output branch for directing an incident light beam to an output port;
   an arm segment connecting the input branch and the output branch;
   a second input coupler connecting the input branch of at least one of said third and forth channel waveguides to the arm segments of said third and fourth channel waveguides,
   a second output coupler connecting the output branch of at least one of said third and fourth channel waveguides to the arm segments of the third and the fourth channel waveguides, whereby the second input coupler splits the light beam between the third and fourth arm segments and the second output coupler recombines the split light beams arriving from the third and fourth arm segments,
   an actuator for modulating the refractive index of at least one of the first, second third and fourth channel waveguide arm segments
   at least one of the third and fourth arm segments has a birefringence Δ of equal magnitude to the birefringence induced in the first or second arm segment by operation of said actuator.

20. An integrated optical Mach-Zehnder interferometer device according to claim 1, wherein the actuator is a thin film heater that modulates the refractive index by increasing the temperature of either the first or second arm segment wherein the device is a variable optical attenuator.

21. An integrated optical Mach-Zehnder interferometer device according to claim 1, wherein the actuator is a thin film heater that modulates the refractive index by increasing the temperature of either the first or second arm segment wherein the device is a thermo-optical switch.

22. An integrated optical Mach-Zehnder interferometer device according to claim 19 wherein said actuator modulates the refractive index of at least one of the third and fourth waveguide arm segments.

23. An integrated optical Mach-Zehnder interferometer device according to claim 19 wherein said actuator modulates the refractive index of at least one of the first and second waveguide arm segments and at least one of the third and fourth waveguide arm segment has an initial birefringence $\Delta$.

24. An integrated optical Mach-Zehnder interferometer device according to claim 19 further comprising an actuator that modulates the birefringence of at least one of the second, third and fourth arm segments.

* * * * *

UNITED STATES PATENT AND TRADEMARK OFFICE
CERTIFICATE OF CORRECTION

PATENT NO. : 6,760,499 B2
DATED : July 6, 2004
INVENTOR(S) : Pezeshki et al.

It is certified that error appears in the above-identified patent and that said Letters Patent is hereby corrected as shown below:

<u>Title page,</u>
Item [*] Notice, "154(b) by days.days." should read -- 154(b) by 143 days. --

<u>Column 3,</u>
Line 43, "the collected device" should read -- the corrected device --

Signed and Sealed this

Fourteenth Day of June, 2005

JON W. DUDAS
*Director of the United States Patent and Trademark Office*